Aug. 4, 1959   J. E. JACOBS   2,898,525
LIGHT RESPONSIVE SYSTEM
Filed March 15, 1955
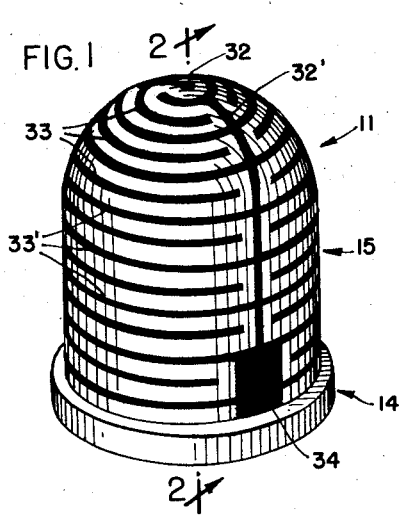
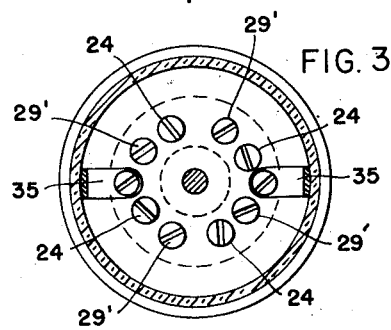
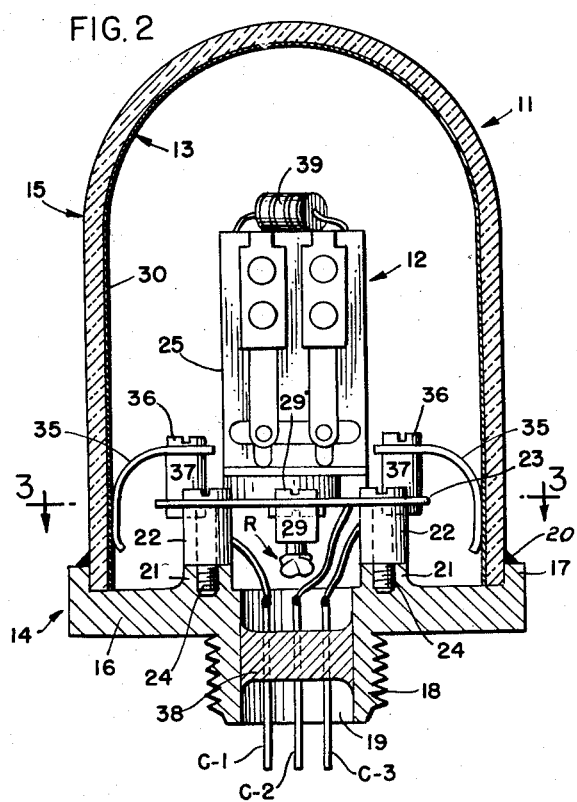
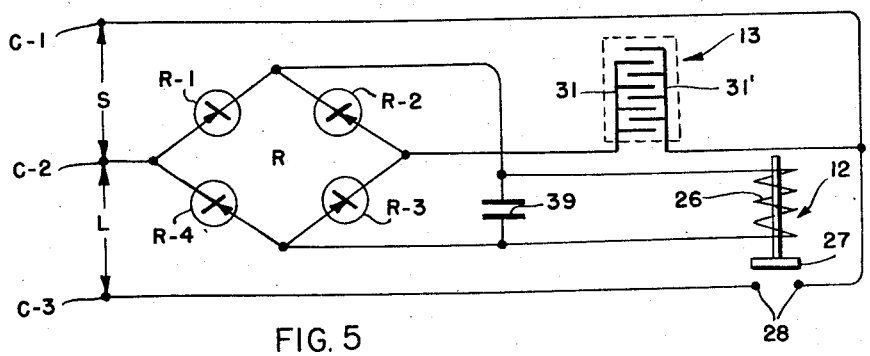
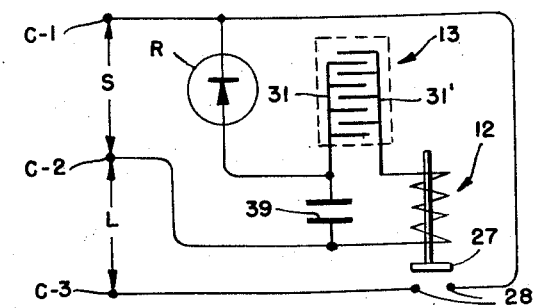
INVENTOR:—
JOHN E. JACOBS
BY:—
James F. Cook, Jr.
ATTORNEY United States Patent Office 2,898,525
Patented Aug. 4, 1959

2,898,525

LIGHT RESPONSIVE SYSTEM

John E. Jacobs, Hales Corners, Wis., assignor to General Electric Company, a corporation of New York Application March 15, 1955, Serial No. 494,400

20 Claims. (Cl. 317—124)

The present invention relates in general to electronics and has more particular reference to photosensitive means adapted to function for the control of an associated operable device or apparatus, in response to change in the intensity of incident light; the invention pertaining more especially to equipment adapted for starting and stopping the operation of lamps, such as street lamps, illuminating systems, or other apparatus, as the intensity of incident light varies from selected levels.

An important object of the present invention is to provide control apparatus, including light sensitive detecting means and an associated operable device, such as an electrical relay, controllingly associated with the detecting means, and adapted for operation in response to variations in light intensity as measured by the detecting means, said relay being adapted for controlling association with any operable apparatus, the operation of which may be desired in response to light intensity variations; a further object being to enclose the light sensitive detecting means, together with the associated relay, in a dirt and moisture proof housing, to thereby provide a convenient unit well adapted for use in position exposed to natural weather conditions, as for the control of power operated equipment including street and other outdoor lighting systems, connection conductors, extending outwardly of the sealed housing, being provided for readily connecting the enclosed components of the unit with the apparatus to be controlled and with a suitable source of energizing power, outwardly of the sealed unit.

Another important object is to provide light responsive control apparatus including a photosensitive detector, an operable device, such as an electrical relay, controllingly associated with the detector and therewith enclosed in a moisture and dirt excluding housing, having a portion formed of material which is substantially transparent to light rays to which the enclosed detector is sensitive, the detector being mounted and disposed behind said ray transparent housing portion in position to be impinged by light rays delivered therethrough; another important object being to form the photosensitive detector as a thin layer of ray responsive material coated upon the inner surface of the ray transparent portion of the housing; a further object being to form the ray transparent housing portion as a dome-like shell of ray transparent material, such shell being readily sealable on a relay supporting base to form therewith an enclosing housing for said relay and detector; a still further object being to form the photosensitive means as a relatively thin layer of ray responsive material coated upon the inner surface of the dome-like shell in position to receive the impingement of incident light rays with maximum efficiency.

Another important object is to provide a photosensitive control unit enclosed in a sealed housing having a ray transparent portion, as of glass, carrying a layer of ray sensitive material coated upon the inner surface of said transparent portion, and electrode means applied upon said layer, including an electrode comprising spaced apart fingers in electrical contact with said layer, throughout substantially the entire extent thereof, and a cooperating electrode embodying similarly spaced apart fingers in electrical contact with said layer, between the fingers of the other electrode whereby the adjacent portions of said electrodes are substantially equally spaced apart, throughout the area of the layer.

Another important object is to provide a light responsive device of the character mentioned, comprising a relay switch, photosensitive light detecting means controllingly connected with said relay switch, and associated circuit components enclosed in a moisture and dirt proof housing and forming a control unit adapted to be mounted in position exposed to skyshine, as on a lamp supporting standard of a street lamp, including conductor means extending outwardly of the housing for controlling connection with a source of energizing power and with a power operated device, such as a street lamp.

Another important object is to provide an inexpensive photosensitive relay device embodying a crystalline light responsive detector, such as the sulphide of cadmium or mercury, or the selenide of cadmium.

Briefly stated, in accordance with one aspect of the invention, the light responsive control apparatus may comprise a support plate forming a base, a relay switch mounted on said base together with rectifying means, a dome-like shell of ray pervious material, such as glass, having an open end end, sealingly secured to the periphery of the support plate to form therewith a moisture and dirt excluding housing enclosing the relay switch and rectifier means, the inner surface of the dome-like shell being coated with a layer of light sensitive material, such as the sulphide of cadmium or mercury or the selenide of cadmium, said layer being provided with spaced electrode means embodying interspersed fingers in electrical contact with said layer substantially throughout its entire area, the apparatus including circuit means within the housing for interconnecting the layer connected electrodes, the rectifier means and the relay switch, the support base being provided with sealed means for interconnecting the housing enclosed components in electrical circuits outwardly of the housing.

The foregoing and numerous other important objects, advantages and inherent functions of the invention will become apparent as the same is more fully understood from the following description, which, taken in connection with the accompanying drawings, discloses preferred embodiments of the invention.

Referring to the drawings:

Fig. 1 is a perspective view illustrating a preferred embodiment of the invention;

Fig. 2 is a sectional view taken substantially along the line 2—2 in Fig. 1;

Fig. 3 is a sectional view taken substantially along the line 3—3 in Fig. 2;

Fig. 4 is a circuit diagram of connections which may be applied in a unit embodying the invention; and Fig. 5 is a circuit diagram of connections illustrating a modified or alternate arrangement embodying the invention.

To illustrate the invention, the drawings show a photosensitive control unit 11 comprising an electrical relay 12 forming an operable device, and photosensitive detector means 13 controllingly connected with said relay for causing the same to operate in response to changes in the intensity of light incident upon the detecting means 13. In the illustrated embodiment, the relay and detecting means 13 are enclosed within a sealed, moisture and dirt proof housing 14 embodying a portion 15 comprising material which is substantially transparent to the rays to which the detecting means 13 is sensitive. The transparent housing portion 15 may comprise glass so that visible light rays penetrating said transparent portion 15 may impinge upon the sensitive detecting means 13 and thereby cause the same to control the operation of the relay 12 in response to changes in the intensity of light rays impinging on the detecting means.

The housing 14 may conveniently comprise a plate-like support base 16, as of metal such as steel, the base being preferably formed with an upstanding peripheral flange 17 and a dependent, preferably cylindrical mounting collar 18, which may be externally screw threaded for attachment on any convenient or conventional support standard. The collar 18 is preferably disposed centrally of the support base 16 and formed integrally therewith, said collar defining an opening 19 through said support base. The ray transparent housing portion 15 may conveniently comprise a dome-like shell, which may have generally hemispherical configuration, or, as shown, the shell may comprise a cylinder, closed at one end and open at the other, the open end of the shell being sized to fit snugly within the flanged rim 17 of the support base whereby the shell may be sealingly secured to the base by any suitable sealing material applied to form a peripheral seal 20.

Inwardly of its marginal edge, the support base may be provided with upwardly extending bosses 21 spaced about the opening 19 and adapted to carry insulators 22, on which, in turn, a support plate 23 may be mounted, said plate and the insulators 22 being secured on the bosses 21, as by means of studs 24 penetrating the mounting plate and insulators and having threaded engagement in the bosses.

The relay 12 may comprise a frame 25 forming a magnetic circuit, an actuating coil 26, a shiftable armature 27, and switch contact elements 28 operated by movement of the armature. The relay may be mounted on the support plate 23 in any suitable or preferred fashion, as by means of fastening screws applied to clampingly fasten the frame 25 on the plate 23. The plate 23 may also carry rectifier means R of any suitable or convenient type, said rectifier means preferably comprising a diode element or elements of semi-conducting material, such as germanium, silicon, or other semi-conductive substance capable of electrical current rectification. As shown, the rectifier means R may be mounted on insulating means 29, which, in turn, may be secured on the mounting plate 23, as by means of fastening screws 29'. As shown more particularly in Fig. 4 of the drawings, a plurality of rectifying elements R-1, R-2, R-3, and R-4 may be employed, said elements being preferably mounted in circularly spaced relation on the plate intermediate the plate supporting insulators 22. As shown more particularly in Fig. 5 of the drawings, the rectifying means may comprise a single rectifying diode element, which, of course, may be supported at any convenient location on the mounting plate 23.

The photosensitive detector means 13 may comprise crystalline light sensitive material, such as the sulphide of cadmium or mercury, or the selenide of cadmium, the same being disclosed in U.S. Letters Patent, No. 2,706,792, which issued April 19, 1955, on the invention of John E. Jacobs in X-Ray Detection. These crystalline photosensitive materials may be comminuted to dust-like consistency, mixed with varnish or shellac as a carrier binder, applied as a thin layer upon the inner surface of the light transparent housing portion 15 and secured in situ by baking the applied layer, preferably in vacuo, to drive off the volatile components of the binder, as described more particularly in U.S. Letters Patent, No. 2,856,641, which issued October 14, 1958, on the invention of John E. Jacobs in Semi-Conducting Device. Crystalline photosensitive material 13 may thus be applied as a thin layer 30 of substantially uniform thickness upon the inner surface of the transparent envelope portion 15. Alternately, the layer 30 may be applied by first vaporizing selected crystalline material and by then allowing the material to condense from its vapor stage as a thin film upon the surfaces of the cover to be coated, vaporization and condensation being preferably accomplished in vacuo.

A pair of spaced apart electrodes 31 and 31' may be provided in electrical contact with the layer 30, said electrodes preferably comprising silver, graphite, aluminum or other preferably metallic electrical conducting material applied as a printed or painted coating upon the inwardly facing surface of the layer 30. To this end, finely divided conducting material may be mixed with a suitable carrier, such as varnish, shellac, alcohol, or lacquer, and applied by painting, printing or spraying through a mask or template, or by a silk screen printing procedure. Alternately, metal, such as silver or aluminum, may be vaporized and applied, through a suitable mask, upon the surface of the layer, and allowed to condense thereon in the desired electrode pattern, as determined by the mask. As shown, the electrodes 31 and 31' comprise each a pair of stripes 32 and 32' extending radially and longitudinally of the shell, from its apex to the open end thereof, respectively, on diametrically opposite sides of the shell, and circumferentially extending fingers 33 and 33' connected, respectively, with said stripes and extending oppositely therefrom, the fingers 33 being substantially parallel and alternately interspersed with respect to the fingers 33', so that all portions of the stripe 32 and fingers 33, comprising one electrode, are substantially equally spaced with respect to the adjacent portions of the stripe 32' and fingers 33', which form the other electrode. The electrodes are each preferably provided with an enlarged conductive portion 34, said portions being preferably disposed on opposite sides of the shell 15 near the open end thereof in position to make electrical contact with cooperating wiper blades 35, secured, as by means of fastening screws 36, on insulating pedestals 37, carried by the support plate 23, means being provided for electrically connecting the wiper blades 35 and, hence, the photosensitive layer connected electrodes with the circuit components mounted on the plate 23.

It will be apparent, of course, that all of the components of the device, other than the shell 15, the shell mounted layer 30 and the layer engaging electrodes, may be mounted and assembled on the support base 16 prior to the application of the shell 15 in housing forming position upon the base member 16. The assembly unit may also include a plurality of conductors C–1, C–2, and C–3, extending in the channel 19 through suitable channel sealing means 38, which may conveniently comprise a body of plastic material having insulating properties applied in the collar 18, in position sealing the opening 19. The conductors C–1, C–2, and C–3 may be electrically interconnected with the components mounted on the plate 23, thereby providing for the connection of the control device 11 with a suitable source of electrical power S for the operation of the device, as well as with an operable load device L, to be controlled in response to the intensity of light rays incident upon the sensitive detecting means 13, the power source being connectible between the conductors C–1 and C–2, and the controllable load device being connectible between the conductors C–2 and C–3. After the assembly of all of the components in position on the support base 16, it is merely necessary to apply the separately fabricated shell 15 in housing forming position on the support base, with the conductive portions 34 of the layer connected electrodes in electrical contact with the wiper contact blades 35, and to apply the peripheral seal 20 in order thus to complete the fabrication of the unit.

As shown more particularly in Fig. 4 of the drawings, the rectifying elements R–1, R–2, R–3, and R–4 may be interconnected to form a rectifying system connected between the power supply conductors C–1 and C–2 in series with the photosensitive means 13, the operating coil 26 of the relay being connected across the output side of the rectification system in parallel with a condenser 39, said condenser being enclosed with the relay within the housing 14. Accordingly, unidirectional current power may be supplied from the rectifying system R, to energize the relay coil 26, in response to the delivery of alternating current power to the rectifying system under the control of the light sensitive means 13. The switch contact elements 28 of the relay may be interconnected between the conductors C–1 and C–3 so as to control the supply of operating power from the power source S to an operable load device L interconnected between the conductors C–2 and C–3 outwardly of the unit 11.

As shown more particularly in Fig. 5 of the drawings, the operating coil 26 of the relay may be interconnected between the power supply conductors C–1 and C–2 in series with the photosensitive means 13 and the rectifying means R, the condenser 39 being shunted across the relay coil and photosensitive means. Accordingly, the rectifying means R may be energized from an alternating power source S, connected between the conductors C–1 and C–2, to thereby supply unidirectional current power to energize the relay coil 26 under the control of the light sensitive means 13. The switch contact elements 28 of the relay may be interconnected between the conductors C–1 and C–3 so as to control the supply of operating power from the power source S to an operable load device L, interconnected between the conductors C–2 and C–3 outwardly of the unit 11.

The photosensitive means 13, in the absence of light, operates substantially as an insulator, thereby preventing current flow therethrough. Accordingly, in the absence of incident light on the layer 30, the rectifying system in Fig. 4 will pass no actuating energy to the relay coil so that the relay will remain de-energized. Likewise, in the Fig. 5 arrangement, in the absence of incident light, the photosensitive means 13, functioning as an insulator, will block the delivery of operating energy through the rectifying means R to the actuating coil of the relay. As the intensity of incident light on the photosensitive means 13 increases from a condition of substantial darkness, the material of the layer becomes progressively more electrically conductive, thereby permitting the delivery of current in increasing amounts to the operating coil of the relay. The relay 12, accordingly, will operate as soon as the intensity of incident light on the photosensitive means 13 reaches a value permitting delivery to the coil 26 of sufficient current to actuate the relay.

The relay switch 28 may comprise either a normally closed or a normally open switch. Where the device embodies a normally closed switch the load device L will be energized for operation whenever the intensity of light incident upon the photosensitive means 13 is below a relay energizing level, the coil 26 becoming energized to open the switch and thereby discontinue the operation of the load device L whenever the intensity of impinging light on the photosensitive means 13 exceeds the relay actuating level.

Where the relay switch comprises a normally open switch adapted to be closed when the coil 26 is energized, actuating energy will be supplied to the load device L only so long as light at or in excess of the relay actuating intensity level of the device is applied to the photosensitive means 13, the supply of operating energy to the load device L being cut off as and when the intensity of incident light on the sensitive means 13 falls below said relay actuating level. If desired, adjustable means may be provided for retarding the operation to any desired variable extent within the range of such adjustable means, in order to allow the device to be set for operation at a desired intensity of incident light on the photosensitive means 13. Alternately, adjustment may be provided by means of adjustable shutter means for controlling the amount of light that is allowed to fall upon the layer 30. In that connection, the shutter means may be disposed in position surrounding and at least partially or completely enclosing or covering the ray pervious housing portion 15, the shutter means including shutter members adjustably shiftable to uncover the pervious portion 15 or to otherwise allow access of light to the layer 30, to a desired extent. For instance, a ray impervious shell formed with a ray pervious window or windows may be mounted upon the base 16, in position enclosing the dome-like shell 15. A shutter member may be shiftably mounted on the ray impervious shell in position to cover the window or windows or to uncover the same to any desired extent. Any suitable, preferred, or convenient adjustable shutter arrangement may, of course, be employed.

It is thought that the invention and its numerous attendant advantages will be fully understood from the foregoing description, and it is obvious that numerous changes may be made in the form, construction, and arrangement of the several parts without departing from the spirit or scope of the invention, or sacrificing any of its attendant advantages, the forms herein disclosed being preferred embodiments for the purpose of illustrating the invention.

No claim is made herein to the cover member 15, per se, nor to the light sensitive layer cell comprising the ray translucent cover member, the layer 30 coated thereon and the interspersed electrodes on and electrically connected with the layer, nor to the herein disclosed methods of applying the layer on the cover member and the electrodes on the layer, the same comprising subject matter of invention set forth in a copending application for United States Letters Patent, Serial No. 498,875, filed April 4, 1955, on the inventions of Norman F. Porath in Layer Cell, in response to which application U.S. Patent No. 2,776,357 was issued on the 1st day of January, 1957.

The invention is hereby claimed as follows:

1. A light sensitive control device comprising a support member of plate-like character, a layer of photosensitive material adhered upon a surface of said member, said member being formed of material substantially transparent to rays to which the material of said layer is sensitive whereby said layer may respond to rays applied thereto through said member, cover means secured on said member in position forming a housing enclosing said layer, and an electrical circuit component mounted on said cover in position enclosed within said housing.

2. A light sensitive control device comprising a support member of hollow shell-like character, a layer of photosensitive material adhered upon the interior surface of said support member, said member being formed of material substantially transparent to rays to which the material of said layer is sensitive whereby said layer may respond to rays applied thereto through said member, cover means secured on said member in position forming a housing enclosing said layer, and an electrical circuit component mounted on said cover in position enclosed within said housing.

3. A light sensitive control system comprising electrical semi-conductor material forming detector means responsive to variation in the intensity of impinging light rays, an electrical power operable device and a solenoid for actuating the same, means forming a housing enclosing said device and solenoid and said detector means and including a ray pervious portion through which light rays may be applied to said detector means from outwardly of said housing, and means for applying electrical power, from a source outwardly of said housing, to energize the solenoid for the actuation of said operable device, under the control of said detector means.

4. A light sensitive control system comprising a power operable device and a solenoid for actuating the same, means forming a housing enclosing said device and solenoid and having a pervious portion substantially transparent to the passage of light rays, electrical semi-conductor material forming detector means responsive to variations in the intensity of impinging light rays, said material forming a layer secured upon the inner surface of said pervious portion in position, within said housing, to receive the impingement of light rays penetrating said pervious portion from outwardly of said housing, and means for applying energizing power, to said solenoid to actuate the operable device, under the control of said detector means.

5. A light sensitive control system comprising electrical semi-conductor material forming detector means responsive to variation in the intensity of impinging light rays, a relay device providing a switch and having a coil operable to actuate the switch when energized, means forming a housing enclosing said relay device and said detector means and including a ray pervious portion through which light rays may be applied to said detector, means to apply relay actuating power, to said coil, under the control of said detector means, from a source outwardly of said housing, and means for controllingly connecting said switch in a circuit to be controlled outwardly of said housing.

6. A light sensitive control system comprising electrical semi-conductor material forming detector means responsive to variation in the intensity of impinging light rays, an electrical power operable device, current rectifying means, means forming a housing enclosing said power operable device together with said detector means and said rectifying means, said housing having a ray pervious portion through which light rays may be applied to said detector means from outwardly of said housing, and means for applying rectified electrical power, to said operable device, under the control of said detector means, from a fluctuating current power source outwardly of said housing.

7. A light sensitive control system comprising electrical semi-conductor material forming detector means responsive to variation in the intensity of impinging light rays, an electrical power operable device, current rectifying means, means forming a housing enclosing said power operable device together with said detector means and said rectifying means, said housing having a ray pervious portion through which light rays may be applied to said detector means from outwardly of said housing, means for applying fluctuating current power to said rectifying means, from a source outwardly of said housing, under the control of said detector means, and means to apply rectified power, from said rectifying means, to said operable device.

8. A light sensitive control system comprising electrical semi-conductor material forming detector means responsive to variation in the intensity of impinging light rays, an electrical power operable device, current rectifying means, means forming a housing enclosing said power operable device together with said detector means and said rectifying means, said housing having a ray pervious portion through which light rays may be applied to said detector means from outwardly of said housing, means for applying fluctuating current power to said rectifying means, from a source outwardly of said housing, and means to apply rectified power, from said rectifying means, to said operable device, under the control of said detector means.

9. The combination, with means forming an electrically powered system, including means forming an operating circuit for delivering energizing power from a suitable source to actuate a circuit connected load device, of light sensitive control means connected with said system and comprising a detector embodying an electrical semi-conductor material responsive to variation in the intensity of impinging rays, a relay device providing a switch and having a coil operable to actuate the switch when energized, means forming a housing enclosing said relay device and detector and including a ray pervious portion through which light rays may be applied to said detector, means to apply relay actuating power, to said coil, under the control of said detector means, from said source outwardly of said housing, and means to controllingly connect said switch in said operating circuit outwardly of said housing, to thereby control the operation of said load device in accordance with the response of said detector to incident light rays.

10. The combination as set forth in claim 9 embodying a normally open relay switch operable to close and activate the operating circuit in response to impingement of light rays upon said detector at intensities in excess of a critical value.

11. The combination as set forth in claim 9 embodying a normally closed relay switch operable to open and inactivate the operating circuit in response to impingement of light rays upon said detector at intensities below a critical value.

12. A light sensitive control unit comprising a support, an electrical power operable device and a solenoid for actuating the same mounted on the support, a cover member of material pervious to light rays secured on said support in position forming therewith a housing enclosing said device and solenoid, electrical semi-conductor material forming detector means responsive to variation in the intensity of impinging light rays, said detector means being supported within said housing in position to receive the impingement of light rays penetrating said cover member from outwardly of the housing, and means including conductors extending outwardly of the housing for applying energizing power, to said solenoid to actuate the operable device, under the control of said detector means.

13. A light sensitive control unit comprising a support, an electrical power operable device and electrical current rectifying means mounted on the support, a cover member of material pervious to light rays secured on said support in position forming therewith a housing enclosing said operable device and said rectifying means, electrical semi-conductor material forming detector means responsive to variation in the intensity of impinging light rays, said detector means being supported within said housing in position to receive the impingement of light rays penetrating said cover member from outwardly of the housing, and means including conductors extending outwardly of the housing for applying rectified actuating power, to said operable device, under the control of said detector means, from a source of fluctuating current power disposed outwardly of said housing.

14. A light sensitive control unit comprising a support, an electrical power operable device and a solenoid for actuating the same mounted on the support, a dome-like shell forming a cover member and having an open end sealed circumferentially to said support to form therewith a housing enclosing said device and solenoid, said shell being formed of material pervious to light rays, electrical semi-conductor material forming detector means responsive to variation in the intensity of impinging light rays, said detector means being supported within said housing in position to receive the impingement of light rays penetrating said cover member from outwardly of the housing, and means including conductors extending outwardly of the housing for applying energizing power, to said solenoid to actuate the operable device, under the control of said detector means.

15. A light sensitive control unit comprising a support, an electrical power operable device and a solenoid for actuating the same mounted on the support, a cover member of glass secured on said support in position forming therewith a housing enclosing said device and solenoid, electrical semi-conductor material forming detector means responsive to variation in the intensity of impinging light rays, said detector means being supported within said housing in position to receive the impingement of light rays penetrating said glass cover member from outwardly of the housing, and means including conductors extending outwardly of the housing for applying energizing power, to said solenoid to actuate the operable device, under the control of said detector means.

16. A light sensitive control unit comprising a support, an electrical power operable device and a solenoid for actuating the same mounted on the support, a cover member of material pervious to light rays secured on said support in position forming therewith a housing enclosing said device and solenoid, comminuted electrical semi-conductor material formed as a ray responsive layer adhered upon the inner surface of said cover member in position to receive the impingement of light rays penetrating said cover member from outwardly of the housing, and means including conductors extending outwardly of the housing for applying energizing power, to said solenoid to actuate the operable device, under the control of said detector means.

17. A light sensitive control unit comprising a support, an electrical power operable device mounted on the support, a cover member of material pervious to light rays secured on said support in position forming therewith a housing enclosing said device, comminuted electrical semi-conductor material formed as a ray responsive layer adhered upon the inner surface of said cover member in position to receive the impingement of light rays penetrating said cover member from outwardly of the housing, a pair of spaced apart layer electrodes electrically connected with a surface of said layer, said electrodes each forming a grid comprising interconnected spaced apart fingers interspersed with respect to the corresponding fingers of the electrode, and means including conductors extending outwardly of the housing for applying actuating power, to said operable device, under the control of said detector means.

18. A light sensitive control unit comprising a support, an electrical power operable device mounted on the support, a cover member of material pervious to light rays secured on said support in position forming therewith a housing enclosing said device, comminuted electrical semi-conductor material formed as a ray responsive layer adhered upon the inner surface of said cover member in position to receive the impingement of light rays penetrating said cover member from outwardly of the housing, a pair of spaced apart layer electrodes electrically connected with a surface of said layer, said electrodes each forming a grid comprising interconnected spaced apart fingers interspersed with respect to the corresponding fingers of the other electrode, said electrodes comprising thin metallic films applied to the surface of the layer, and means including conductors extending outwardly of the housing for applying actuating power, to said operable device, under the control of said detector means.

19. A light sensitive control unit comprising a support, an electrical power operable device mounted on the support, a cover member of material pervious to light rays secured on said support in position forming therewith a housing enclosing said device, comminuted electrical semi-conductor material formed as a ray responsive layer adhered upon the inner surface of said cover member in position to receive the impingement of light rays penetrating said cover member from outwardly of the housing, a pair of spaced apart layer electrodes electrically connected with a surface of said layer, said electrodes each forming a grid comprising interconnected spaced apart fingers interspersed with respect to the corresponding fingers of the other electrode, said electrodes comprising thin films of silver applied to the surface of the layer, and means including conductors extending outwardly of the housing for applying actuating power, to said operable device, under the control of said detector means.

20. A light sensitive control unit comprising a plate-like support formed centrally with mounting means for securing the support on a mounting, a relay device mounted on said support and providing a switch, said relay having a coil operable to actuate the switch when energized, current rectifying means mounted on said support, a dome-like shell of material pervious to light rays, said shell having an open end sealingly secured circumferentially on said support in position forming therewith a dirt and moisture excluding housing enclosing said relay and said rectifying means, comminuted electrical semi-conductor material forming a detector responsive to variation in the intensity of impinging light rays, said material being formed as a layer adhered upon the inner surface of said dome-like shell in position to receive the impingement of light rays penetrating said shell from outwardly of said housing, spaced apart layer electrodes electrically connected with a surface of said layer within said housing, and circuit forming means, including conductors extending outwardly of the housing through conductor sealing means for applying actuating power, for the operation of said relay, through said rectifying means, under the control of said detector, and controllingly connecting said switch in an electrical circuit to be controlled externally of said housing.

References Cited in the file of this patent

UNITED STATES PATENTS

| | | |
|---|---|---|
| 1,345,586 | Coblentz | July 6, 1920 |
| 1,697,451 | Baird | Jan. 1, 1929 |
| 1,880,289 | Sukumlyn | Oct. 4, 1932 |
| 2,027,751 | Nelson | Jan. 14, 1936 |
| 2,066,211 | McCreary | Dec. 29, 1936 |
| 2,096,916 | Pook | Oct. 26, 1937 |
| 2,183,256 | Gabber | Dec. 12, 1939 |
| 2,646,533 | Carne | July 21, 1953 |
| 2,691,707 | Lovejoy | Oct. 12, 1954 |
| 2,776,357 | Porath | Jan. 1, 1957 |